Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 1

INVENTORS: W. T. HAINES
J. B. NEWSOM

BY J. W. Schmied

ATTORNEY

CROSSBAR TANDEM OFFICE FOR TELEPHONE SYSTEMS

Filed Nov. 17, 1948 9 Sheets-Sheet 2

INVENTORS: W. T. HAINES
J. B. NEWSOM
BY J. W. Schmied
ATTORNEY

Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 3

INVENTORS: W. T. HAINES
J. B. NEWSOM
BY J. W. Schmied
ATTORNEY

INVENTORS: W. T. HAINES
J. B. NEWSOM
BY J. W. Schmied
ATTORNEY

Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 5

INVENTORS: W. T. HAINES
J. B. NEWSOM
BY J. W. Schmied
ATTORNEY

Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 6

INVENTORS: W. T. HAINES
J. B. NEWSOM
BY J. W. Schmied
ATTORNEY

INVENTORS: W. T. HAINES
J. B. NEWSOM
BY
J. W. Schmied
ATTORNEY

Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 8

INVENTORS: W. T. HAINES
J. B. NEWSOM
BY J. W. Schmied
ATTORNEY

Nov. 3, 1953 W. T. HAINES ET AL 2,658,108

CROSSBAR TANDEM OFFICE FOR TELEPHONE SYSTEMS

Filed Nov. 17, 1948 9 Sheets-Sheet 9

INVENTORS: W. T. HAINES
J. B. NEWSOM
BY J. W. Schmied
ATTORNEY

Patented Nov. 3, 1953 2,658,108

UNITED STATES PATENT OFFICE 2,658,108

CROSSBAR TANDEM OFFICE FOR TELEPHONE SYSTEMS

William T. Haines, Mountain Lakes, N. J., and James B. Newsom, Great Neck, N. Y., assignors to Bell Telephone Laboratories, Incorporated, New York, N. Y., a corporation of New York Application November 17, 1948, Serial No. 60,502

13 Claims. (Cl. 179—16)

This invention relates to telephone systems, and more particularly to equipment in a tandem office.

Offices within an exchange area may be interconnected either by direct trunks or by trunks extending through a tandem office. Whether direct trunks or tandem trunks are provided for use in a particular connection is primarily a question of traffic density, although tandem trunking may also serve to supplement direct trunking.

When two offices are connected through a cross bar tandem office, the tandem sender must be capable of receiving, registering, and transmitting to the tandem marker not only two and three-digit designations of terminating offices, but also a series of special codes designed to accomplish special functions in connection with intertoll dialing.

An object of the present invention is to provide a tandem sender capable of distinguishing between, registering, and transmitting to the marker three-digit and two-digit office codes.

Another object of the invention is to provide a tandem sender capable of registering and transmitting to the marker a special type of code known as a service code and capable of distinguishing that type of code from other codes received.

Another object of the invention is to provide a tandem sender capable of registering and transmitting to the marker a special type of code known as a TX code and capable of distinguishing two-digit TX codes and three-digit TX codes from each other and from other codes received.

In general, these objects have been attained by providing the tandem sender with a series of digit registers designated A, B, C, thousands, hundreds, tens, units, and stations. The input leads to the tandem sender are sequentially connected to these several registers by means of a pair of walking relays associated with each of the digit registers. In addition, two pairs of counting relays are provided.

The three digits of a three-digit office code are registered on the A, B and C digit registers, respectively. Means responsive to the registration of the third digit are arranged to connect leads from each of the A, B and C digit registers to the marker whereby the three digits of the office code may be transmitted to the marker.

The two digits of a two-digit office code are registered on the A and B digit registers, respectively, and means are provided, responsive to the specific digits preselected as two-digit office code indices, to effectively by-pass the C digit register. These means also function, responsive to the registration of the second digit, to connect leads from the A digit register to the marker, to impress on those leads normally associated with the B digit register a representation of the digit "0," and to connect to the B digit register those leads normally associated with the C digit register whereby the two digits of a two-digit office code may be transmitted to the marker as a three-digit code with "0" as the second digit.

A service code is a two-digit code prefixed by the digit "1." The initial digit "1" is registered on the first pair of counting relays and the two digits of the service code are registered on the A and B digit registers, respectively. The first pair of counting relays is arranged to function, in cooperation with means responsive to a start signal from the originating operator, to impress on those leads normally associated with the A digit register a representation of the digit "1," and to operate additional means to connect to the A digit register those leads normally associated with the B digit register and to connect to the B digit register those leads normally associated with the C digit register whereby the service code is transmitted to the marker as a three-digit code with "1" as the initial digit.

A TX code is a two-digit or three-digit code prefixed by the digits "11." The initial digits "11" are registered on the two pairs of counting relays, respectively, and the two or three digits of the TX code are registered in the A and B, or A, B and C digit registers, respectively. A two-digit TX code is transmitted to the marker in the same manner as is a service code, and a three-digit TX code is transmitted to the marker in the same manner as is a three-digit office code. Means associated with the second pair of counting relays are arranged to indicate to the marker that a TX code is being transmitted.

The invention may be more clearly understood from a consideration of the following description with reference to the accompanying drawings, in which:

Figs. 2 to 9 show portions of the tandem sender of which:

Figs. 2 and 3 show the counting relays, walking relays, and relays for distinguishing the type of code received;

Figs. 4 and 6 show the A and AA digit registers;

Figs. 5 and 7 show the B and C digit registers;

Figs. 8 and 9 show the relays for associating the tandem sender digit registers with the marker, and, diagrammatically, a marker and a marker connector.

Figures 1, 10:
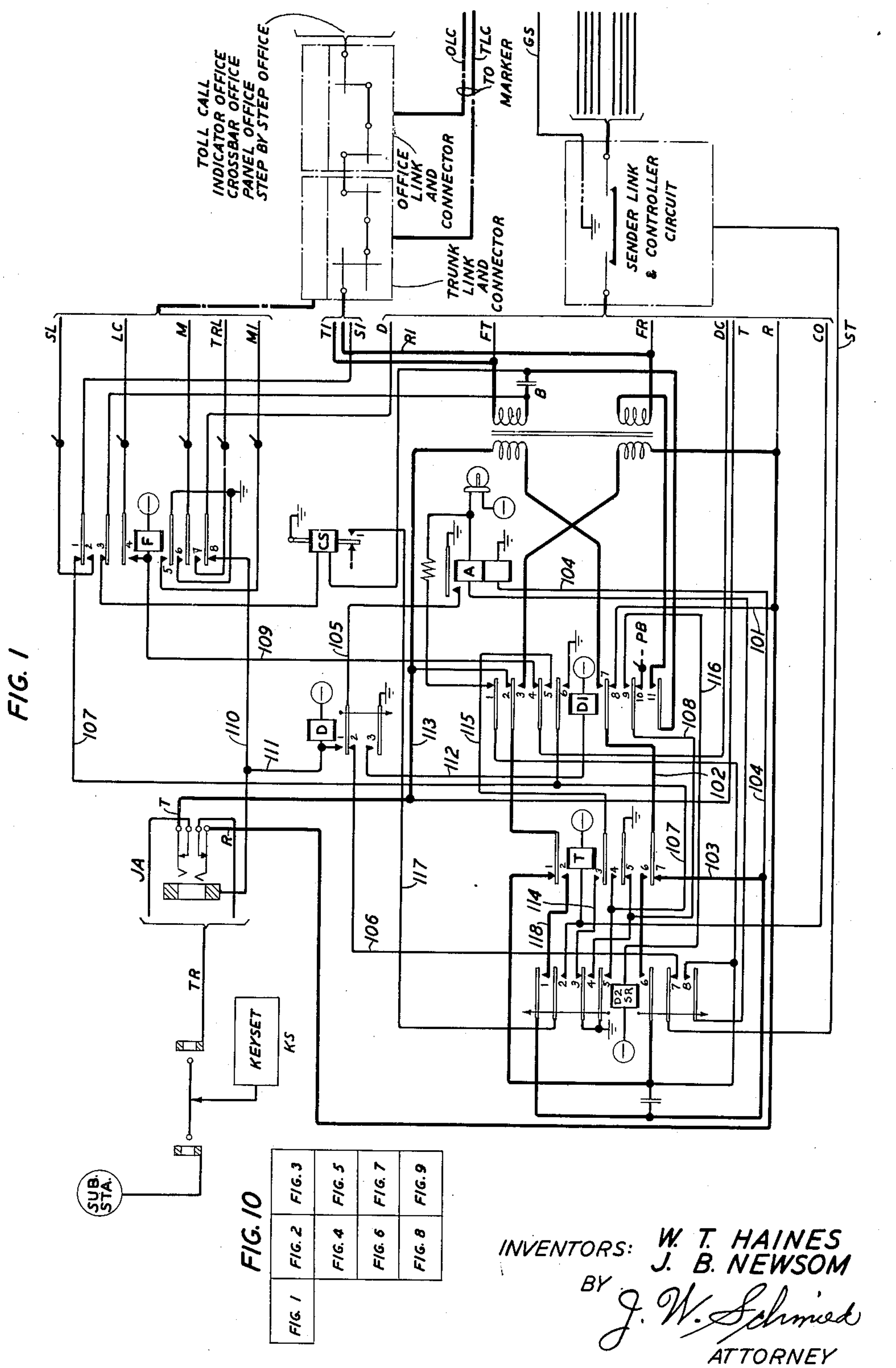
Fig. 1 shows a tandem trunk circuit, and, diagrammatically, an originating office, an incoming trunk at a tandem office, a sender link and controller circuit, and a trunk link and connector connecting with trunks to a plurality of terminating offices.
Fig. 10 shows the manner of arranging Figs. 1 to 9.

No details of the originating and terminating offices or of much of the equipment immediately associated with the tandem sender have been shown. Portions of the tandem sender not essential to the present disclosure have been omitted. Reference is here made to the tandem telephone system disclosed in Patent 2,281,636, granted May 5, 1942, to W. B. Strickler and to the patents therein referred to for a complete disclosure of the portions of a suitable telephone system not shown in detail herein.

The thousands, hundreds, tens, units, and stations digit registers and associated walking relays have been omitted from the drawings for purposes of clarity.

Throughout the following description, functional reference characters have been used to identify the relays and certain of the leads. The relay designations are followed by a number in parentheses representing the figure of the drawing in which that relay appears, for example, relay ON1(2) appears in Fig. 2 and has as its major function the control of certain off-normal grounds. The location of the functionally designated leads is believed to be apparent from the context.

Referring now to Fig. 1 of the drawings, the calling subscriber establishes a connection to the operator's position within his dialing area by any well known means and informs the operator of the designations of the desired office and station or desired special code. Upon determining that the desired destination may be reached through a tandem office, the operator selects an available trunk TR which extends through test jack JA(1) to conductors T and R of the tandem office trunk circuit. The operator is provided with a key-set KS(1) which, in the preferred embodiment of the invention, may be of the multifrequency type as disclosed, for example, in Patent 2,332,912, granted October 26, 1943, to G. Hecht et al.

When the tandem trunk circuit of Fig. 1 is seized, relay A(1) is operated over a circuit from battery at the originating office over the ring conductor of the trunk, lower normal contacts of test jack JA(1), conductor R, conductor 101, No. 8 contact of relay D1(1), conductor 102, No. 7 contact of relay T(1), conductor 103, conductor 104, lower winding of relay A(1), to ground. Relay A(1), in operating, closes a circuit from ground, contact of relay A(1), conductor 105, No. 2 contact of relay D(1), conductor 106, No. 7 contact of relay D2(1), conductor ST and to the sender link. The sender link then functions to connect an idle sender of the proper type to the tandem trunk circuit of Fig. 1. As will be hereinafter explained, the sender is arranged, in response to its seizure, to connect ground over conductor CO, winding of relay T(1), to battery. Relay T(1) operates thereby releasing relay A(1) since the above-described energizing circuit for relay A(1) is interrupted at the No. 7 contact of relay T(1). Relay T(1) in operating also connects ground over the sleeve lead S1 to the hold magnets of the link switches, when later operated, over a path from ground, No. 4 contact of relay T(1), conductor 107, No. 1 contact of relay F(1) and sleeve lead S1. The normally complete circuit from ground, No. 5 contact of relay T(1), conductor 108, No. 10 contact of relay D1(1) to lead PB is also interrupted upon the operation of relay T(1). Lead PB is provided to permit connection to a traffic register circuit which may be of the type disclosed in Patent 2,274,083, granted February 24, 1942, to C. G. Miller.

When relay A(1) releases, the above-traced path over which ground is connected to the ST lead is interrupted at the No. 1 contact of relay A(1), and the removal of this ground allows the sender to complete its functions.

Figure 2:
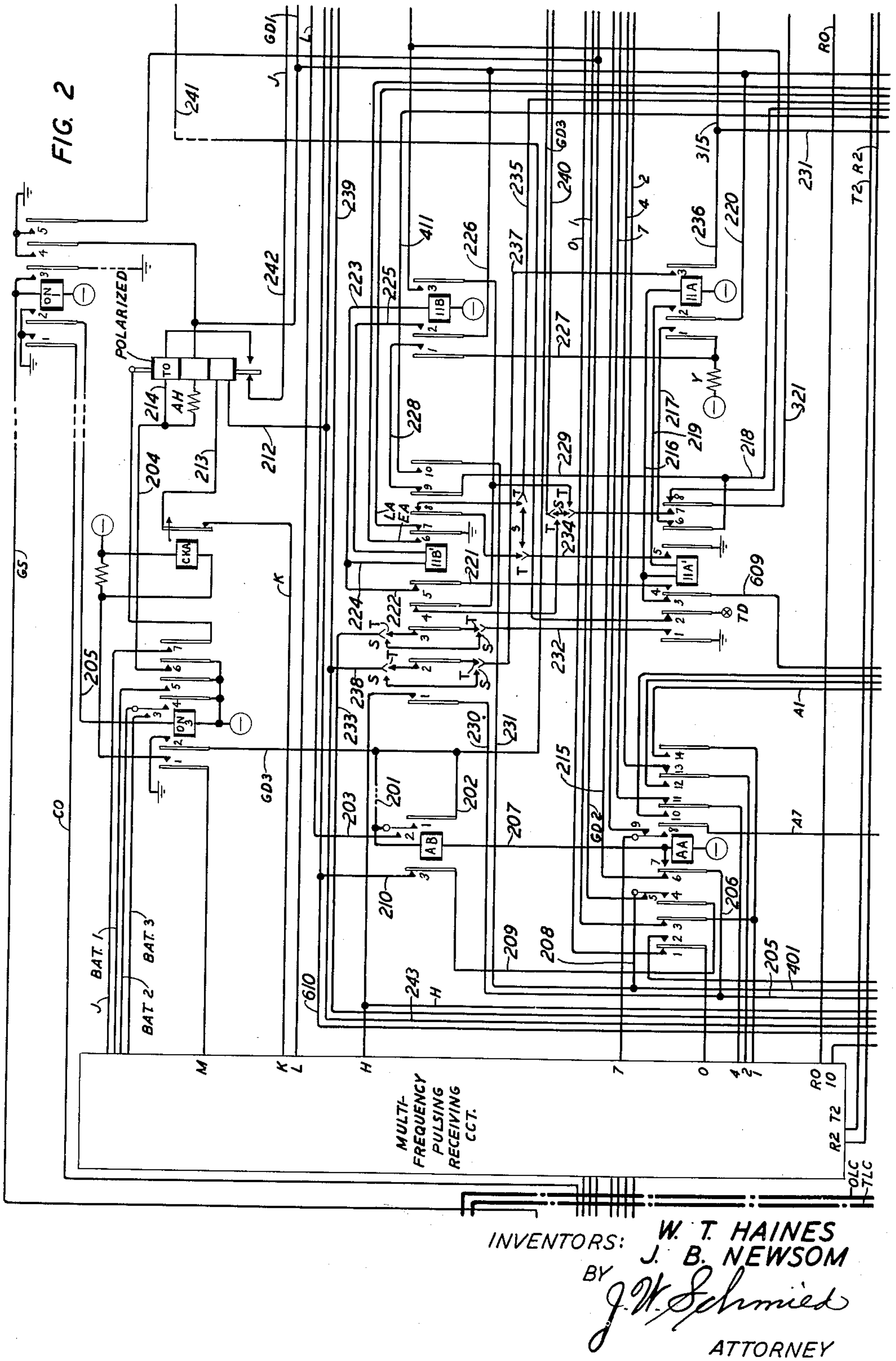
Figure 3:
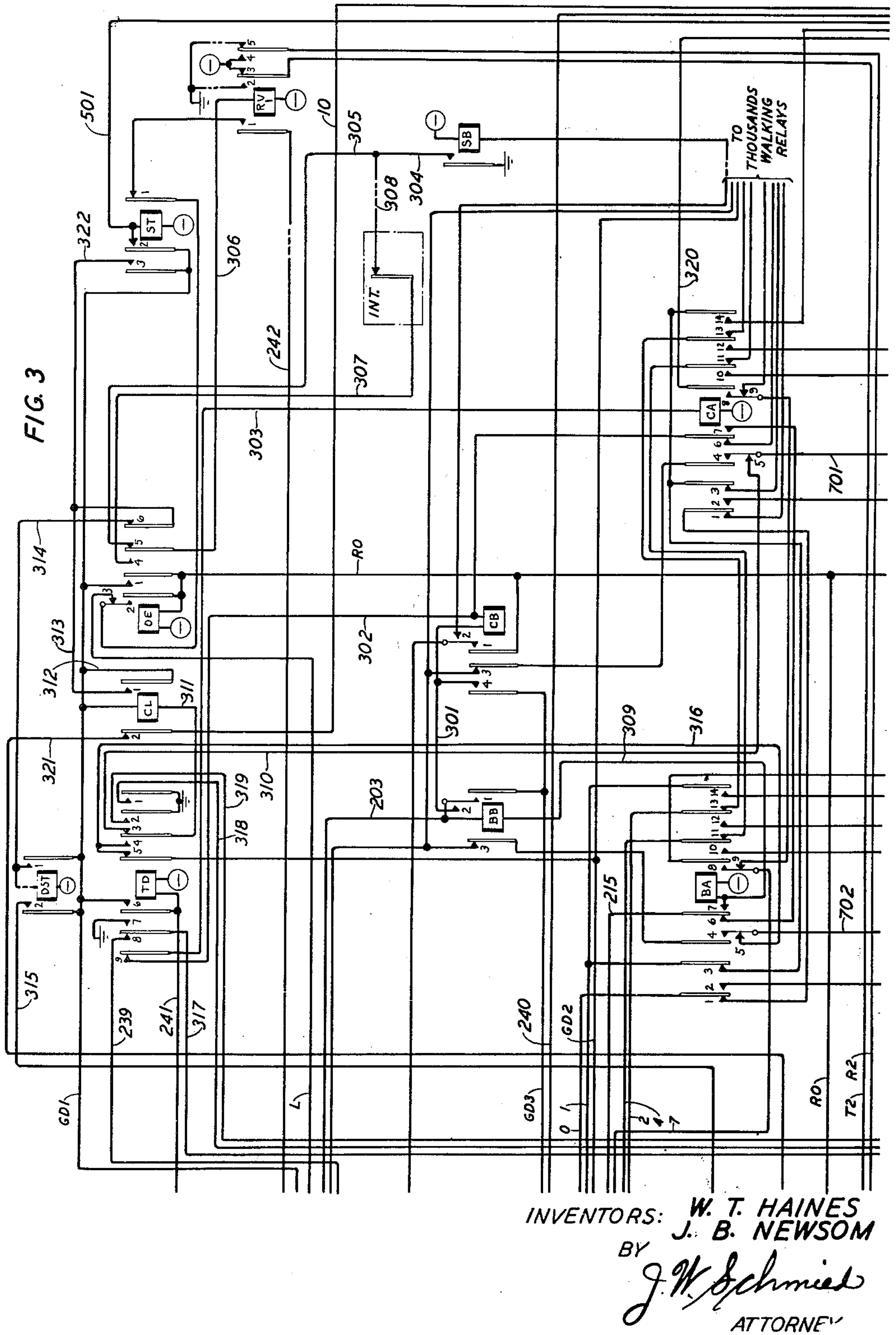
Figure 4:
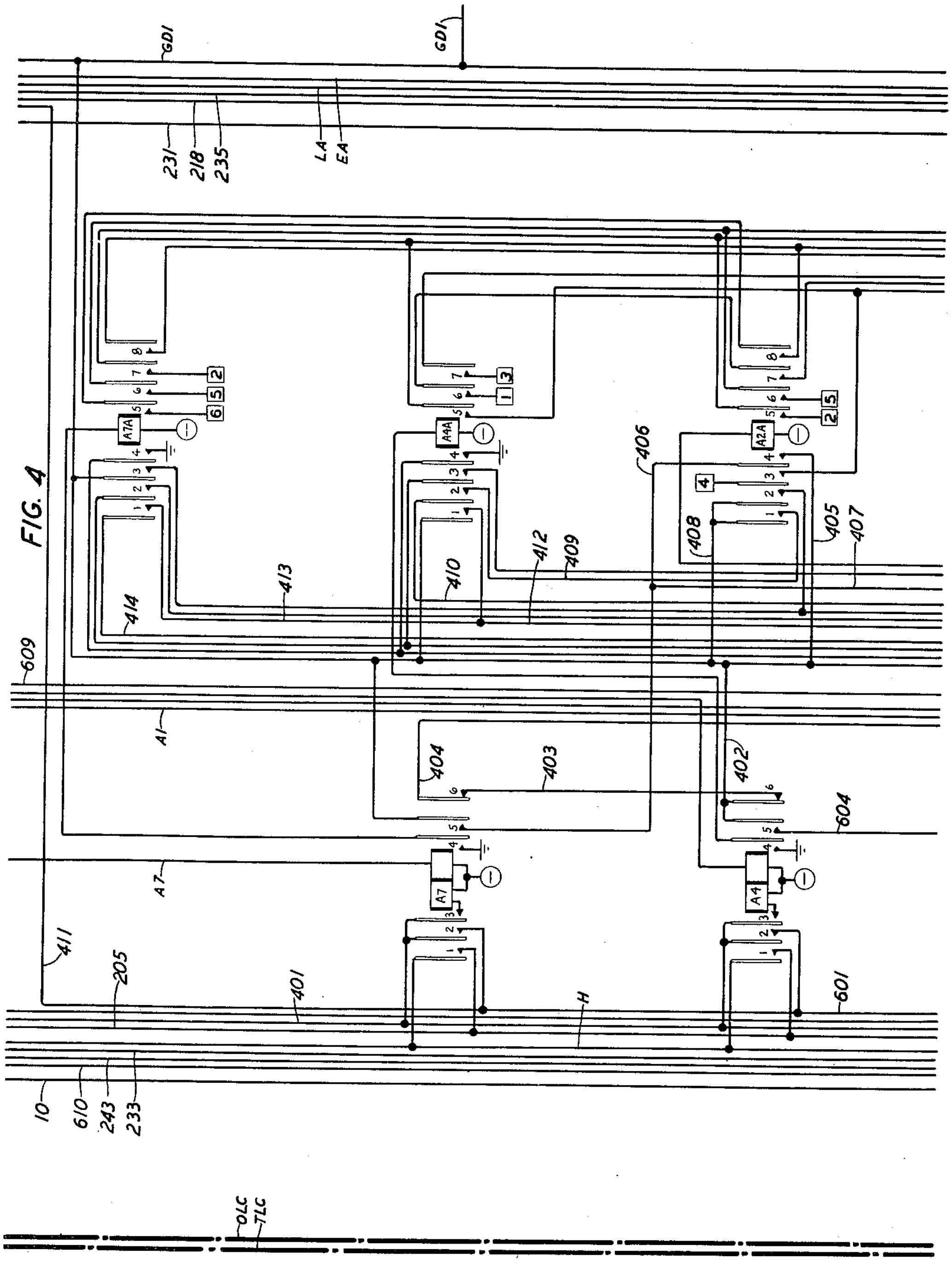
Figure 5:
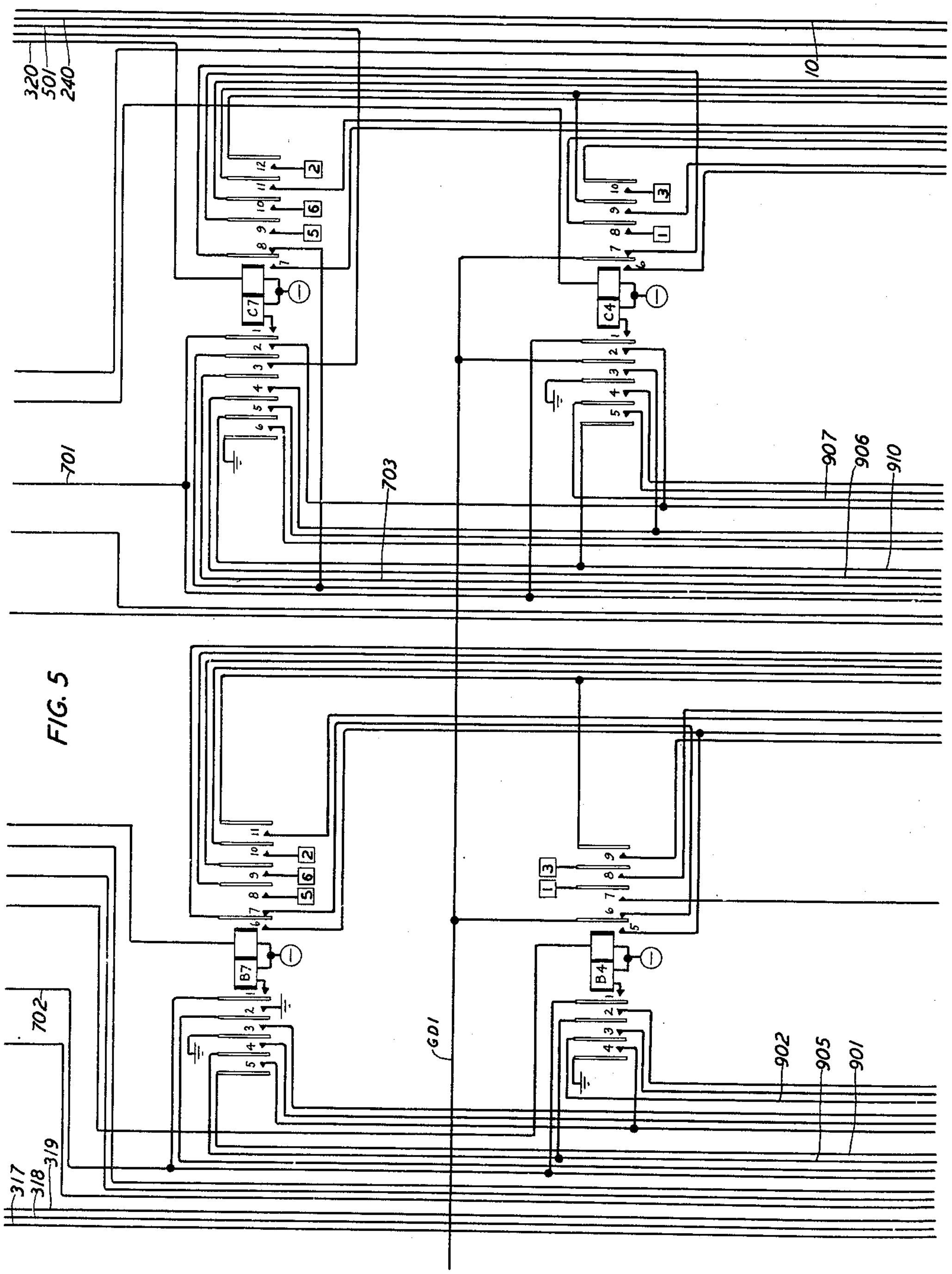
Figure 6:
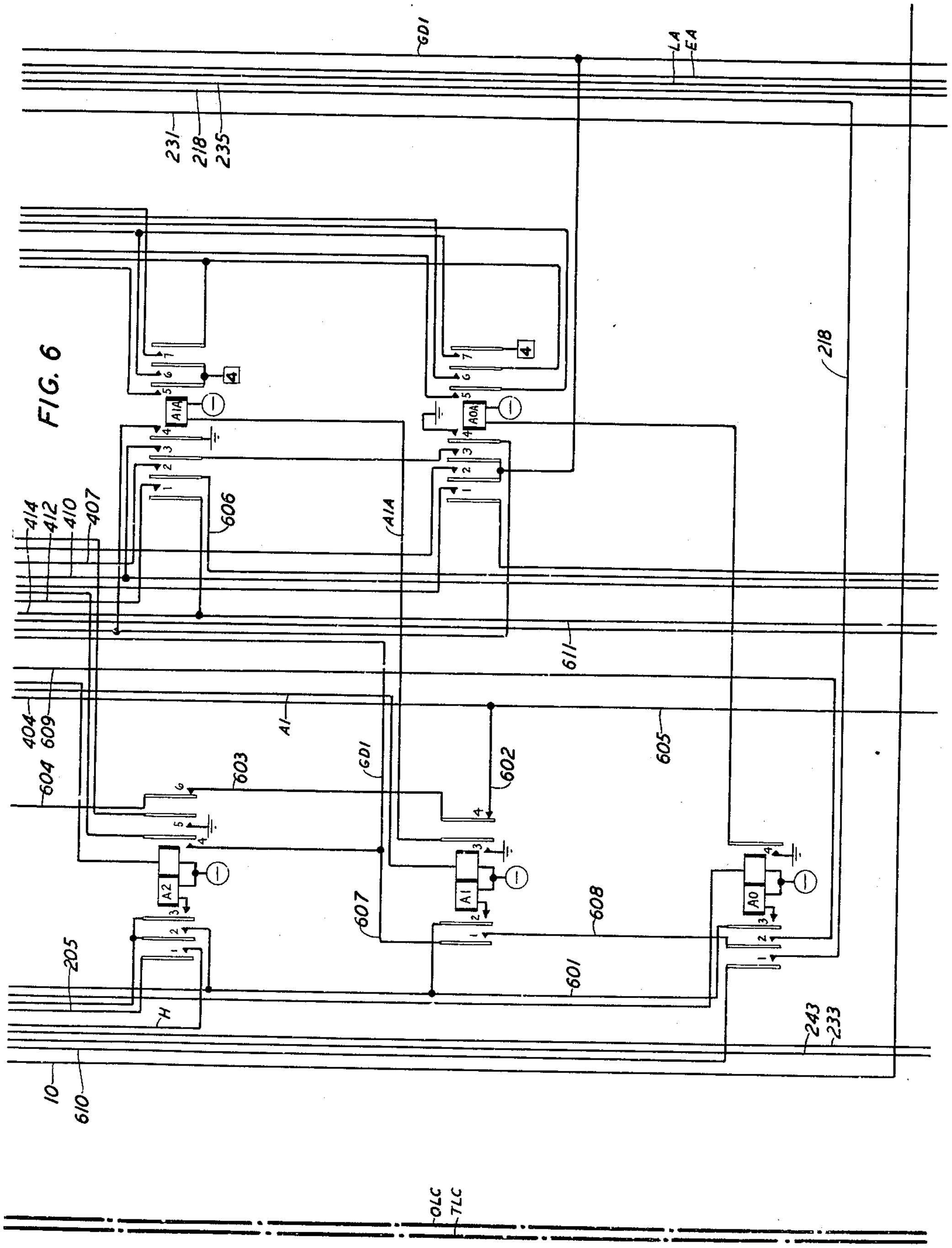
Figure 7:
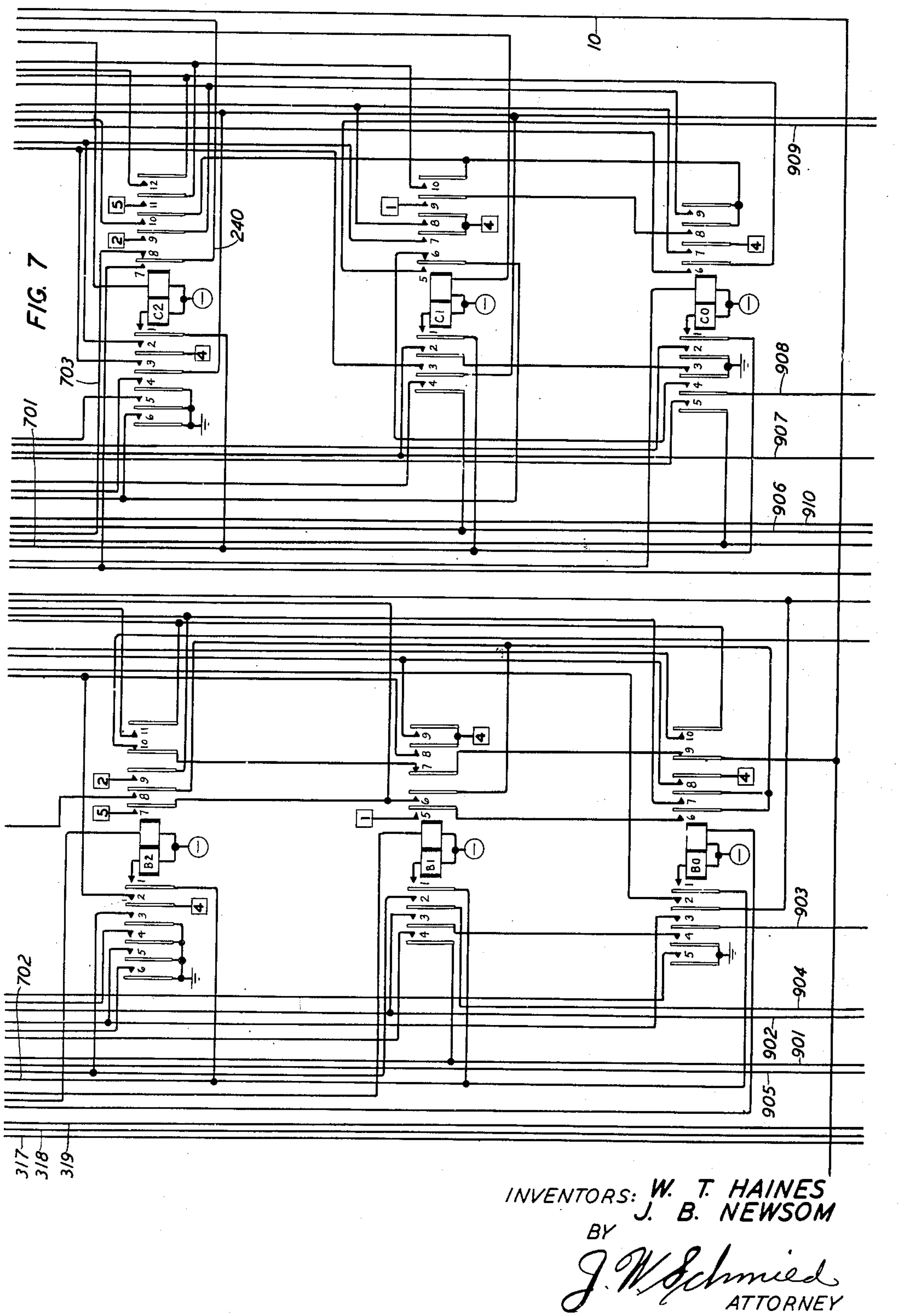

At this time the T1, R1 and S1 leads are connected to the trunk link and connector (Fig. 1), and the D, FT, FR, DC, T, R, CO and ST leads are connected through the sender link and controller circuit to the multifrequency pulsing receiving circuit shown diagrammatically in Fig. 2. A suitable type of multifrequency pulsing receiving circuit is disclosed in the above-cited patent to Hecht et al.

When the sender is seized by the sender link and controller circuit to serve a call, elements of the sender (not shown) immediately register the trunk link frame number and the class of service in the well-known manner. When this initial registration has been completed, the sender link (Fig. 1), after making a test to guard against a double connection, grounds common lead GS thus operating relay ON1(2). Relay ON1(2), upon operating, locks itself to ground over its No. 3 contact, connects supply ground through its Nos. 4 and 5 contacts to off-normal ground leads GD1 and GD2, respectively, and closes a circuit from ground, No. 2 contact of relay ON1(2), conductor 205, winding of relay ON3(2), and to battery, thereby operating relay ON3(2). Relay ON1(2) also connects ground through its No. 1 contact to the CO lead to operate relay T(1) in the tandem trunk circuit as was previously mentioned.

Relay ON3(2), in operating, connects battery through its Nos. 3, 4 and 5 contacts, and over leads BAT1, BAT2, and BAT3 to the multifrequency pulsing receiving circuit. Battery is also conducted through the No. 6 contact of relay ON3(2), over conductor 204, and through resistance AH(2), biasing winding of relay T0(2) to off-normal ground lead GD1. The biasing winding of relay T0(2) is thereby energized to ensure that relay T0(2) is closed on its back contact by the time any pulsing frequencies are received in the multifrequency pulsing receiving circuit.

In general, the sender is provided with eight digit registers of five relays each wherein the "A," "B," "C," thousands, hundreds, tens, units, and stations digits may be registered. The digit register for the "A" digit comprises relays A0(6), A1(6), A2(6), A4(4) and A7(4). The digit register for the "B" digit comprises relays B0(7), B1(7), B2(7), B4(5) and B7(5). The digit register for the "C" digit comprises the relays C0(7), C1(7), C2(7), C4(5) and C7(5). Similarly, thousands, hundreds, tens, units, and stations digit registers are provided, although they have been omitted from the drawings for the sake of clarity. In some cases auxiliary relays are required to provide sufficient contacts, as, for example, in the case of the "A" digit register in which auxiliary relays A0A(6), A1A(6), A2A(4), A4A(4), and A7A(4) are provided.

The registration leads from the receiving circuit are transferred successively from digit to digit by means of a walking circuit comprising a pair of relays per digit register. Digit register "A" is provided with walking relays AA(2) and AB(2); digit register "B" is provided with walking relays BA(3) and BB(3); digit register "C" is provided with walking relays CA(3) and CB(3); and the remaining digit registers are similarly provided with associated pairs of walking relays.

These pairs of walking relays are all operated before registration commences, and are progressively released as registration proceeds. Operation of relay ON3(2) connects supply ground through the No. 2 contact of relay ON3(2) to off-normal ground lead GD3, conductor 201, through the windings of relays AB(2) and AA(2) in series, to battery. Relays AB(2) and AA(2) therefore operate and lock over the No. 1 contact of relay AB(2) and conductor 202 to off-normal ground lead GD3. Relay AB(2), in operating, closes ground from off-normal ground lead GD3, No. 2 contact of relay AB(2), conductor 203, through the winding of relays BB(3) and BA(3) in series, and to battery. Relays BB(3) and BA(3) operate and lock over the No. 1 contact of relay BB(3) to off-normal ground lead GD3. Relay BB(3), in operating, closes ground from off-normal ground lead GD3, No. 1 and No. 2 contacts of relay BB(3), conductor 301, winding of relay CB(3), conductor 302, No. 9 contact of relay TD(3), conductor 303, winding of relay CA(3), and to battery. Relays CB(3) and CA(3) operate and lock to off-normal ground lead GD3 over the No. 4 contact of relay CB(3). Similarly, the walking relays associated with the thousands, hundreds, tens, units and stations digit registers are progressively energized and locked.

When the SB(3) walking relay associated with the final or "stations" digit register is operated in response to the operation of the walking relays associated with the "units" digit register, ground is connected through the depicted contact of relay SB(3), conductor 304, conductor 305, No. 5 contact of relay OE(3), conductor 306, winding of relay RV1(3) to battery. Relay RV1(3), in operating, reverses the battery and ground connections to the T2 and R2 leads through the multifrequency pulsing receiving circuit, through the tandem trunk circuit and over the trunk TR(1). This reversed battery is a signal to the originating operator that registration pulsing may begin.

The operation of the RV1(3) relay also closes the loop to the J and L leads to the multifrequency pulsing receiving circuit shown in Fig. 2. This circuit may be traced in part from the J lead at the multifrequency pulsing receiving circuit, No. 7 contact of operated relay ON3(2), left-hand contact of relay T0(2), conductor 242, No. 1 contact of relay RV1(3), No. 1 contact of relay ST(3), No. 3 contact of relay OE(3), over the L lead to the multifrequency pulsing receiving circuit in Fig. 2. This J-L loop is in series with the primary windings of the channel relays in the multifrequency receiving circuit and renders those relays operative when pulses of the correct frequencies are received from the originating operator's key-set. This path also subsequently acts as a locking path for the channel relays.

When the originating operator receives the reversed battery "start pulsing" signal, she depresses the "KP" key in the multifrequency pulsing key-set KS(1) thereby transmitting a "KP" signal to prepare the receiving circuit to receive multifrequency pulses for digit registration in accordance with the disclosure of the above-cited patent to Hecht et al. The termination of this "KP" signal causes the 0, 1, 2, 4, 7, and 10 leads (Fig. 2) from the contacts of the channel relays to be cut through to the sender. The originating operator then operates key-set KS(1) to pulse out the designations of the destination of the call and follows these designations by a "start signal" which grounds the 7 and 10 leads to indicate the completion of pulsing.

As disclosed in the above-cited patent to Hecht et al., each digit is registered in the sender by the grounding of two and only two of the five leads 0, 1, 2, 4, 7 from the multifrequency receiving circuit, according to the typical two-out-of-five code convention:

| Digit | Leads Grounded |
|---|---|
| 0 | 4, 7 |
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |

If only one frequency is received by the multifrequency receiver, only one register relay will be operated and the T0(2) relay will not operate, as described hereinafter, and the sender will be prevented from further functioning. If more than two frequencies are received simultaneously by the multifrequency receiver, the RO lead to the sender is grounded in the multifrequency receiver as shown in the above-cited patent to Hecht et al. This ground is conducted over lead RO to the winding of relay OE(3) and to battery. Relay OE(3), in operating, locks to off-normal ground lead GD1 through its No. 1 contact and opens, at its No. 3 contact, the J-L loop to the multifrequency receiver to prevent the receipt of any further digits. Relay OE(3) also interrupts the previously traced energizing circuit for relay RV1(3) at the No. 5 contact of relay OE(3), and closes an energizing circuit for relay RV1(3) from battery, winding of relay RV1(3), conductor 306, No. 4 contact of relay OE(3), conductor 307, interrupter INT(3), conductor 308, conductor 304, contact of relay SB(3) to ground. Since relay RV1(3) is thereby periodically energized and released, reversed battery pulses are thus sent over the T and R leads to the originating operator as a recorder signal.

It may be noted that an operating circuit is prepared for relay CKA(2) from conductor M which may be grounded in the multifrequency receiver, and through the No. 1 contact of relay ON3(2), when relay ON3(2) is operated. The multifrequency receiving circuit is arranged to operate relay CKA(2) initially and preceding the registration of each digit to provide a slight delay in closing the operating path of the T0(2) relay to ensure time for the multifrequency receiver, upon recognizing receipt of more than two frequencies, to ground the RO lead as above described.

*Registration of three-digit office codes*

In general, a three-digit office code is registered on the A, B and C digit registers. The numerical digits designating the called station are registered on the thousands, hundreds, tens, units and stations digit registers, respectively.

When the called station is designated by a three-digit office code followed by the numerical digits, receipt of two frequencies representing the first or A office code digit causes the multifrequency receiver (Fig. 2) to ground lead H and two of the leads 0, 1, 2, 4 and 7. However, in accordance with the conventional practice, the number "1" is never used for the first digit of an office code, and therefore the combination of leads 0 and 1 will never be grounded to represent the first digit of an office code.

The ground on two of the 0, 1, 2, 4, and 7 leads operates the corresponding register relays in the A digit register. For example, if the first digit of the office code is "8," leads 1 and 7 will be grounded by the multifrequency receiver. Ground will be conducted from the 1 lead, No. 14 contact of operated walking relay AA(2), conductor A1, winding of relay A1(6), and to battery. Relay A1(6), in operating, closes a circuit from ground, No. 3 contact of relay A1(6), conductor A1A, winding of relay A1A(6) to battery. Relay A1A(6) is operated in order to provide additional contacts for functions hereinafter to be described. Simultaneous grounding of the 7 lead by the multifrequency receiver will pass ground over lead 7, No. 8 contact of relay AA(2), conductor A7, winding of register relay A7(4), to battery. Relay A7(4), in operating, energizes, through its No. 4 contact, relay A7A(4) to provide auxiliary contacts. It is apparent that the grounding of any other pair of leads 0, 1, 2, 4, or 7 will result in the operation of the corresponding A and AA register relays.

It will be noted that operation of register relays A2(6), A4(4), or A7(4) will close a circuit from grounded conductor H, through the No. 1 contact of any of those relays, conductor 205, conductor 206, No. 7 contact of relay AA(2), conductor 207, winding of relay AB(2), to ground on off-normal ground lead GD3. Therefore, the operation of any pair of A register relays, except A0(6) and A1(6) in combination, will provide a path for the H lead ground to shunt down the AB(2) relay, but continue to hold the AA(2) relay operated.

The holding windings of the two relays which have been operated in the A digit register (any two except the combination of A0(6) and A1(6)) are connected in parallel to the primary winding of relay T0(2). With the exemplary operation of the A digit register relays A1(6) and A7(4), the holding winding of relay A1(6) is connected from battery to conductor 601 through the No. 2 contact of relay A1(6), through the No. 2 contact of relay A7(4), and then to conductor 401. The holding winding of relay A7(4) is also connected from battery through the No. 3 contact of relay A7(4) and to conductor 401. The circuit then extends over conductor 401, conductor 208, No. 4 contact of relay AA(2), conductor 209, No. 3 contact of released relay AB(2), conductor 210, conductor 212, primary winding of relay T0(2), conductor 213, contact of relay CKA(2), to conductor K which is grounded in the multifrequency receiver circuit unless the latter has received more than two frequencies as above discussed. As previously indicated, relay CKA(2) was released a brief interval following the receipt of the two frequencies by the multifrequency receiver, and at the same time the multifrequency receiver connected a ground on the J-L loop, which includes back (left-hand) contact of relay T0(2) as previously described, to lock the channel relays of the multifrequency receiver operated after the multifrequency pulses from the originating keyset have ceased.

As previously mentioned, the T0(2) relay will not operate if only one frequency is received in the multifrequency receiver. This is the case since T0(2) is a marginal relay which will not operate in series to battery when the resistance of the holding winding of a single register relay is in series therewith, but will operate when the resistances of two register relay holding windings in parallel are connected in series therewith.

When relay T0(2) operates, it locks over a path from battery, No. 6 contact of relay ON3(2), conductor 204, conductor 214 through the winding of relay T0(2), front (right-hand) contact and armature of relay T0(2), through the No. 7 contact of relay ON3(2) to ground in the multifrequency receiver. Relay T0(2), in operating, also opens, at its back (left-hand) contact, the L lead to interrupt the locking path for the channel relays in the multifrequency receiver. At this time, if the multifrequency pulses have ceased, or otherwise when the multifrequency pulses do cease, the channel relays will release. In so doing, they release an auxiliary check relay in the multifrequency receiver which removes the ground from the H lead and reconnects ground to the M lead. Removal of ground from the H lead releases the AA(2) relay inasmuch as the previously traced locking path therefor is interrupted. The release of the AA(2) relay connects the 0, 1, 2, 4, and 7 leads over the Nos. 1, 3, 13, 11, and 9 contacts, respectively, of relay AA(2), through the Nos. 2, 14, 12, 10, and 8 contacts, respectively, of previously operated relay BA(3) to the corresponding relays in the "B" digit register. Relay AA(2), in releasing, also effectively transfers the H lead to the BA(3) relay over a path including front contacts of the operated A2(6), A4(4), or A7(4) register relays, conductor 205, conductor 206, No. 6 contact of relay AA(2), conductor 215, No. 7 contact of relay BA(3), conductor 309, winding of relay BB(3), No. 1 contact of relay BB(3) to ground at off-normal ground lead GD3. Thus, in the B digit register, the H lead ground closure does not depend on the prior operation of one of the B digit register relays, but is applied immediately to shunt down the BB(3) relay simultaneously with the operation of the B digit register relays, and such is also the case in the remaining digit registers.

The M lead ground reoperates relay CKA(2) to slightly delay closure of the J-L loop as previously mentioned.

In a similar fashion to that above described, the "B" digit is registered in the B digit register, relay BA(3) is released transferring the 0, 1, 2, 4, and 7 leads to the CA(3) relay and releasing relay CB(3), the "C" digit is registered in the C digit register and so on through the thousands, hundreds, tens, units, and stations digits.

*Registration of two-digit office codes*

In general, a two-digit office code is registered on the A and B digit registers and the C digit register is by-passed. As before, the numerical digits designating the called station are registered on the thousands, hundreds, tens, units, and stations digit registers, respectively. Any A digit except the digit "1" may be used as a two-digit office code index. For whatever digit or digits are selected to serve as indices for a two-digit office code, the corresponding cross-connection terminals L2, L3, L4, L5, L6, L7, L8, or L9 at relay AB5(8) are connected to terminal TD at relay 11A'(2). For instance, if the digits "3" and "6" are to be the indices for a two-digit office code, terminals L3 and L6 at relay AB5(8) are connected to terminal TD at relay 11A'(2).

In general, in order that receipt of a two-digit office code index may prepare the circuits so that the third digit to be received will be registered in the thousands digit register rather than improperly registered in the C digit register, the circuits are arranged so that registration of a two-digit office code index on the A digit register will serve to release the CA(3) and CB(3) walking relays, thereby effectively by-passing the C digit register. This is accomplished by associating circuits with the A and AA digit register relays whereby operation of two of the five relays in the A and in the AA digit registers, representing a certain digit on a two-out-of-five code basis, will result in ground being connected through the contacts of the AB5(8) relay to the "L" terminal corresponding to that digit. The circuits associated with the AB5(8) relay are so arranged that that relay is initially operated and remains operated if the A digit is "0" to "4," but is released if the A digit is "5" to "9." Ground will therefore be connected to terminal TD if the initial digit is the index, or one of the indices, for a two-digit station code. Ground on the TD terminal will be conducted through a back contact of the 11A'(2) relay to the TD(3) relay which serves to release the CA(3) and CB(3) walking relays thereby effectively by-passing the C digit register and causing the third received digit to be registered in the thousands digit register as it properly should be.

In detail, relay AB5(8) was initially operated upon the operation of relay ON1(2) over an energizing circuit which may be traced from ground on off-normal ground lead GD1, conductor 402, No. 6 contact of relay A4(4), conductor 403, No. 6 contact of relay A7(4), conductor 404, conductor 605, winding of relay AB5(8), to battery. When the digits "2" or "3" are registered, neither relay A4(4) nor relay A7(4) is operated so this energizing path is uninterrupted and relay AB5(8) will remain operated and terminals L2 and L3 will be connected through the Nos. 3 and 9 contacts, respectively, of relay AB5(8). When the digit "4" is registered, relay A4(4) will operate but an energizing path for relay AB5(8) may still be traced from ground on off-normal ground lead GD1, conductor 402, No. 5 contact of energized relay A4(4), conductor 604, No. 6 contact of relay A2(6), conductor 603, No. 4 contact of relay A1(6), conductor 602, conductor 605, winding of relay AB5(8) to battery. Therefore terminal L4 will be connected through the No. 7 contact of relay AB5(8). If any larger digit, "5" through "9," is received, the energizing path for relay AB5(8) will be interrupted at one or more of the following points: No. 4 contact of relay A1(6), No. 6 contact of relay A2(6), No. 6 contact of relay A4(4), No. 6 contact of relay A7(4). Therefore, when a digit from "5" to "9" is registered in the A digit register, relay AB5(8) will release so that terminals L5, L6, L7, L8 and L9 will be connected through the Nos. 1, 4, 2, 10, and 8 contacts, respectively, of relay AB5(8).

Presuming now that the digits "3" and "6" have been selected as the indices for a two-digit office code and that the L3 and L6 terminals (Fig. 8) have been cross-connected to the TD terminal (Fig. 2). An initially received digit "3" will then be registered in the A and AA digit registers as above described with the A1(6), A2(6), A1A(6), and A2A(4) relays being operated and locked. The AB5 relay will remain operated as previously discussed. Ground will therefore be conducted from off-normal ground lead GD1, conductor 405, No. 4 contact of operated relay A2A(4), conductor 406, conductor 407, No. 2 contact of operated relay A1A(6), conductor 606, No. 10 contact of relay BTR(8), conductor 801, No. 9 contact of operated relay AB5(8) to terminal L3 which is connected to terminal TD. Similarly, receipt of the A digit "6", which also has been selected as a two-digit office code index, will result in the operation of register relays A2(6), A4(4), A2A(4), and A4A(4). Relay AB5(8) will be released as above discussed. Ground will be conducted from off-normal ground lead GD1, conductor 408, No. 1 contact of operated relay A2A(4), conductor 409, No. 2 contact of operated relay A4A(4), conductor 410, No. 1 contact of relay BTR(8), conductor 802, No. 4 contact of released relay AB5(8), to terminal L6 which is connected to terminal TD.

Ground at terminal TD is passed over the No. 2 contact of relay 11A'(2), conductor 241, winding of relay TD(3), to battery. Relay TD(3) operates and locks over its No. 6 contact to ground on off-normal ground lead GD1. As will be recalled from the previous discussion, both the operating and locking paths for relays CA(3) and CB(3) included the No. 9 contact of relay TD(3). Therefore, the operation of relay TD(3) will cause the release of relays CA(3) and CB(3). The release of these relays transfers the 0, 1, 2, 4, and 7 leads to the walking relays associated with the thousands digit register as previously described so that the third digit to be received is properly channeled to the thousands digit register.

It may be noted that the AB5(8) relay should be of the fast-releasing type so that it will be released, if it is going to release, before the operating ground for the TD(3) relay is supplied by the operation of the auxiliary A digit register relays A0A(6) to A7A(4).

*Special codes*

Two types of special codes may be employed in connection with intertoll dialing: service codes and TX codes.

Service codes are those used by toll operators to obtain special connections, such as to the toll information board, to the toll test board, to route and directory positions, and so forth. Service codes generally are, and are herein presumed to be, two-digit numbers prefixed by the digit "1." As indicated hereinafter, a TX code is prefixed by the digits "11," and therefore the first digit of the service code proper cannot be the digit "1." Therefore a service code, when prefixed by the digit "1," may be any number from 100 to 109, and from 120 to 199.

TX codes may be either two-digit or three-digit codes prefixed by the digits "11," i. e., "11EX" or "11EXX" codes, where "X" represents any digit from "0" to "9," and "E" represents any digit except "0."

TX codes are used principally in the completion of delayed toll calls. In the case, for instance, of a person-to-person call in which the called party is unavailable, the operator may ask that the called party be requested to call the toll or long distance operator at the city where the call has originated, and designates this operator by the city name and a number, two-digit or three-digit as the case may be. When the called party later asks his own operator to connect him with the toll operator "EX" or "EXX" in the distant city, his operator will dial or key the digits "11EX" or "11EXX" over a toll line. This will connect the toll line to the operator position or team in the originating office, who will then complete the call to the original calling subscriber.

Certain TX codes are used for special purposes such as establishing toll conference connections, connections to charge-quotation operators, and so on.

*Registration of service codes*

When a service code, 100 to 109, or 120 to 199, is received, the initial "1" is registered by the operation of the counting relays 11A(2) and 11A'(2), and the second and third digits are registered on the A and B digit registers.

When an initial digit "1" is received, which indicates that the ensuing designation is not an office code, it is received and passed into the A digit register in the normal fashion. Relays A0(6), A1(6), A0A(6) and A1A(6) are operated to register the digit, but it may be noted that these relays do not lock operated. As previously indicated, the operation of the combination of register relays A0(6) and A1(6) does not establish a path whereby the H lead ground may shunt down the AB(2) relay to advance the walking circuit. Instead, the operation of this combination of A digit register relays closes a circuit from ground on off-normal ground lead GD1, conductor 607, No. 1 contact of relay A1(6), conductor 608, No. 2 contact of relay A0(6), conductor 609, No. 3 contact of relay 11A'(2), conductor 216, winding of relay 11A(2), to battery. It may be noted that although relay 11A(2), in operating, prepares an energizing path for relay 11A'(2) over a path from battery, winding of relay 11A(2), conductor 216, winding of relay 11A'(2), conductor 219, No. 2 contact of relay 11A(2), conductor 220 to ground on off-normal ground lead GD1, relay 11A'(2) will not operate at this time since that energizing path is shunted to ground over the traced energizing circuit for relay 11A(2). Upon the operation of relay 11A(2), battery is connected through resistance Y(2), which is equivalent to the resistance of two register relay locking windings in parallel, No. 1 contact of relay 11A(2), conductor 217, No. 6 contact of relay 11A'(2), conductor 218, No. 1 contact of register relay A0(6), conductor 610, conductor 212, winding of relay T0(2), conductor 213, contact of relay CKA(2), to conductor K which is grounded in the multifrequency receiver. Operation of relay T0(2) allows the channel relays in the multifrequency receiver to release as previously described and the release of these relays in turn releases the digit register relays A0(6), A1(6), A0A(6), and A1A(6). Release of register relay A0(6) interrupts the above-traced energizing path for relay T0(2), and consequently relay T0(2) releases. The release of relays A0(6) and A1(6) also interrupts the previously traced shunting path around relay 11A'(2), and relay 11A'(2) will be operated. The initial digit "1" is therefore registered by the operation of relays 11A(2) and 11A'(2).

The first digit of a service code (the second digit to be received) may be any digit except the digit "1" and since the A digit register walking relays have not been released, the register circuits of the sender respond to the receipt of the first and subsequent digits of the service code proper in the same manner as they respond to the first and subsequent digits of an office code, i. e., the first digit of the service code proper is registered on the A digit register, the A digit register walking relays are released, and the second digit of the service code is registered on the B digit register.

*Registration of TX codes*

When a TX code preceded by the digits "11" is received, the two successive digits "1" are registered on the 11A(2), 11A'(2), 11B(2), and 11B'(2) counting relays. The following two or three digits of the TX code are registered on the A and B, or on the A, B and C digit registers, respectively.

The initial digit "1" preceding a TX code is registered on the 11A(2) and 11A'(2) relays as described above in connection with the initial digit "1" of a service code. Receipt of the second digit "1" preceding a TX code results in the reoperation of A digit register relays A0(6) and A1(6) in the same manner. These register relays, in operating, close a circuit from ground at off-normal ground lead GD1, conductor 607, No. 1 contact of relay A1(6), conductor 608, No. 2 contact of relay A0(6), conductor 609, No. 4 contact of relay 11A'(2), conductor 221, No. 5 contact of relay 11B'(2), conductor 222, conductor 223, winding of relay 11B(2) to battery. Relay 11B(2), in operating, prepares an energizing circuit for relay 11B'(2) from ground on off-normal ground lead GD1, conductor 226, No. 2 contact of relay 11B(2), conductor 225, winding of relay 11B'(2), conductor 224, conductor 223, winding of relay 11B(2) to battery, but relay 11B'(2) cannot operate at this time because of the shunt comprising conductor 222 and the path to ground through the contacts of register relays A0(6) and A1(6) traced in describing the energizing circuit for relay 11B(2).

When relay 11B(2) operates, relay T0(2) is again energized through a path from battery, resistance Y(2), conductor 227, No. 1 contact of relay 11B(2), conductor 228, No. 9 contact of relay 11B'(2), conductor 229, conductor 218, No. 1 contact of relay A0(6), conductor 610, conductor 212, winding of relay T0(2), conductor 213, contact of relay CKA(2), and conductor K to ground in the multifrequency receiver. Operation of relay T0(2) allows the channel relays in the multifrequency receiver to release, and they, in turn, release register relays A0(6) and A1(6). Relay T0(2) will then release since its energizing circuit will be interrupted at the No. 1 contact of relay A0(6). The register relays, in releasing, will also interrupt, at the No. 2 contact of relay A0(6) and at the No. 1 contact of relay A1(6), the previously traced shunting circuit around the winding of relay 11B'(2), and therefore relay 11B'(2) will operate.

Relay 11B'(2), in operating, prepares a path to close the H lead to shunt out relay AB(2) and to provide a locking path for relay AA(2) on the next operation of the relays in the A digit register, over a path from the H lead, No. 1 contact of relay 11B'(2), conductor 230, conductor 206, No. 7 contact of relay AA(2), then in one direction through the winding of relay AA(2) to battery and in the other direction through conductor 207, winding of relay AB(2) to ground at off-normal ground lead GD3. This path is rendered effective upon the operation of any combination of two A digit register relays, including relays A0(6) and A1(6), operative to register the digit "1." Therefore, the third digit to be received (the first digit of the TX code) will be registered in the A digit register. This is true even if the third digit is "1" since relay 11B'(2), in operating, prepares an independent locking path for the holding windings of relays A0(6) and A1(6) from battery, holding winding of relay A0(6), No. 3 contact of relay A0(6) to conductor 601 and from battery, holding winding of relay A1(6), No. 2 contact of relay A1(6) to conductor 601, conductor 411, No. 10 contact of relay 11B'(2), conductor 231, conductor 208, No. 6 contact of relay AA(2), conductor 209, No. 3 contact of released relay AB(2), conductor 210, conductor 212, winding of relay T0(2), conductor 213, contact of relay CKA(2) to conductor K which is grounded in the multifrequency receiver. The registration then proceeds in the normal fashion with the AA(2) relay releasing to prepare the B digit register to register the fourth digit to be received (the second TX code digit). If three-digit TX codes are used the third digit thereof (the fifth digit to be received) is registered on the C digit register.

*Communication with marker—three-digit office codes*

After sufficient information has been registered in the sender, the sender seizes a marker which may be of the general type shown in Patent 2,235,803, granted March 18, 1941, to W. W. Carpenter and preferably is of a type embodying the modifications disclosed in Patent 2,559,312, granted July 3, 1951 to J. B. Newsom.

In the case of a three-digit office code, the sender is arranged to seize a marker after the three office code digits have been registered. With two of the five C digit register relays C0(7) to C7(5) operated, a circuit is closed from battery, holding windings of the two operated relays C0(7) to C7(5), No. 1 contact of those operated C digit register relays, conductor 701, No. 5 contact of released walking relay CA(3), conductor 310, No. 3 contact of unoperated relay TD(3), conductor 311, winding of relay CL(3) to ground at off-normal ground lead GD1. Relay CL(3), in operating, closes a circuit from off-normal ground lead GD1, conductor 312, No. 1 contact of relay CL(3), conductor 313, No. 6 contact of relay OE(3), conductor 314, winding of relay DST(3) to battery. Relay DST(3) locks to ground on off-normal ground lead GD1 over its No. 1 contact and closes, at its No. 2 contact, a circuit from ground on off-normal ground lead GD1, conductor 315, conductor 231, winding of relay BTR(8) to battery, thereby operating relay BTR(8). The operation of relay DST(3) also closes circuits (not shown) to cause the marker connector (Fig. 8) to connect the leads from the sender register relays into the marker (Fig. 8).

Figure 8:
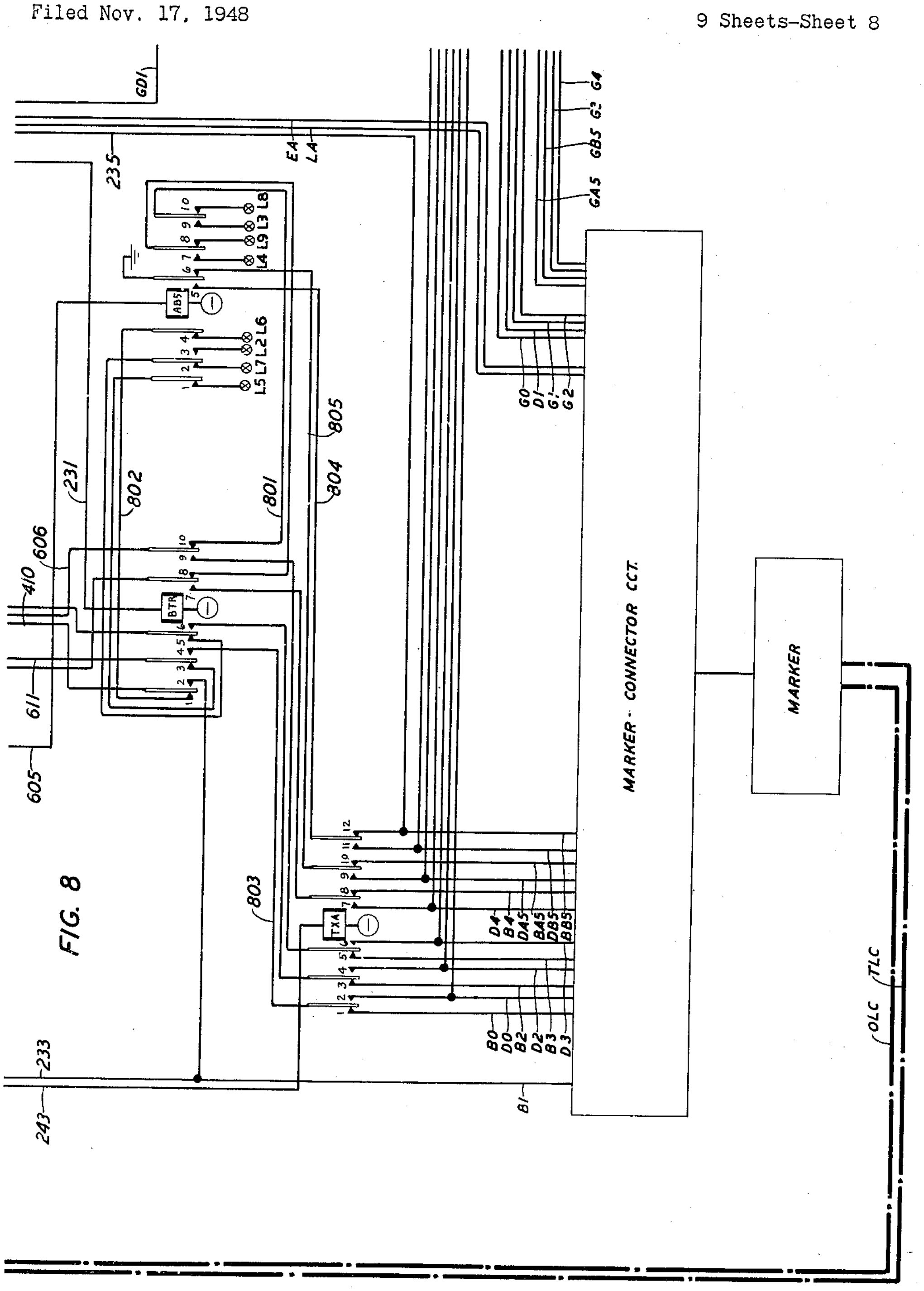
Figure 9:
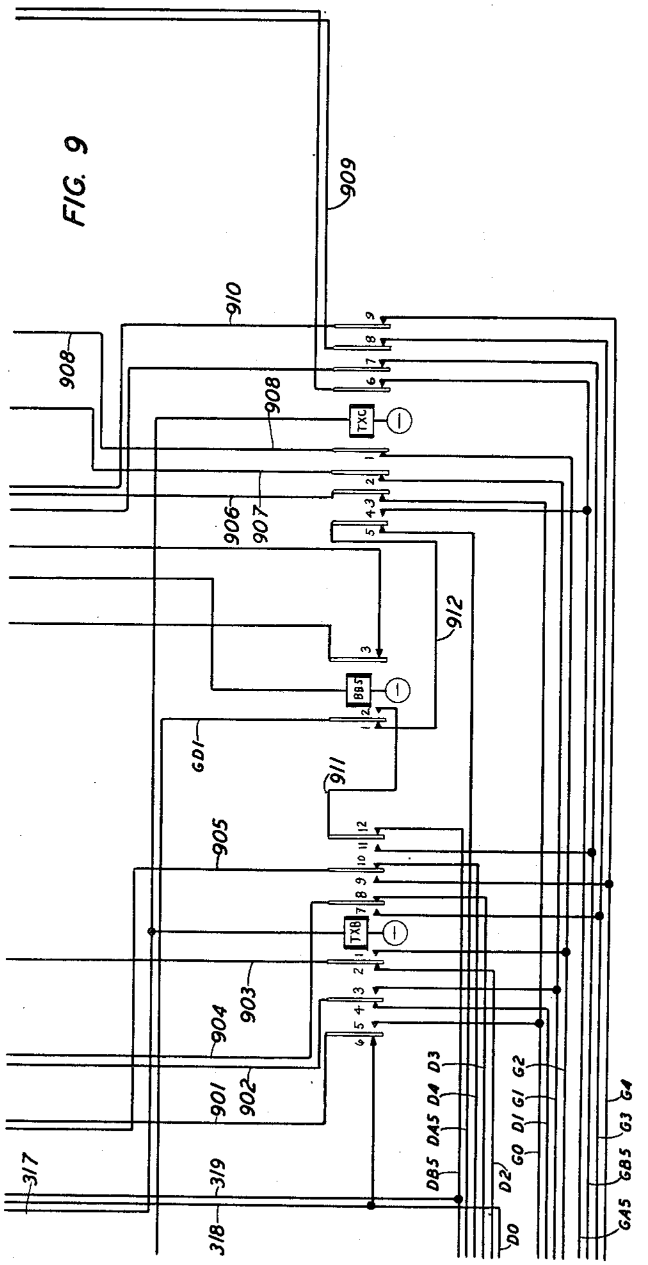

The sender transmits the office code registrations to the marker B–, D–, and G– series leads which are shown connected to the marker connector in Fig. 8. Any pair of A and AA register relays operated to register the A digit connects ground to one of the B0 to B4 leads to the marker. For example, registration of the digits "0" or "5" will ground the B0 lead, over a circuit, for the digit "0," from ground at lead GD1, No. 1 contact of relay A4A(4), conductor 413, No. 1 contact of relay A7A(4), conductor 414, conductor 611, No. 4 contact of operated relay BTR(8), conductor 803, No. 1 contact of unoperated relay TXA(8) to lead B0. Registration of the digit "5" results in the closure of a circuit from ground at off-normal ground lead GD1, No. 1 contact of relay A4A(4), conductor 412, No. 1 contact of relay A1A(6), over conductor 611, No. 4 contact of operated relay BTR(8), conductor 803, No. 1 contact of unoperated relay TXA(8), and to lead B0. Similarly, and by obvious circuits, registration of the digits "1" or "6" in the A digit register results in the grounding of lead B1, registration of the digit "2" or "7" results in the grounding of lead B2, registration of the digit "3" or "8" results in the grounding of lead B3, and registration of the digit "4" or "9" results in the grounding of lead B4. Since the grounding of one of the B series leads indicates only that one of two digits is registered in the A digit register, means must be provided to enable the marker to distinguish between the pairs of digits. This is accomplished by grounding the BB5 lead if the digit is less than "5" and by grounding the BA5 lead if the digit is "5" or above. As previously discussed, relay AB5(8) is responsive to the value of the digit registered in the A digit register, being held operated if the digit is less than "5" and being released if the digit is "5" or greater. With a digit less than "5" registered and relay AB5(8) consequently being operated, ground is connected over the No. 5 contact of relay AB5(8), conductor 804, No. 12 contact of relay TXA(8), to the BB5 lead. With a digit "5" or greater registered and relay AB5(8) consequently released, ground is connected over the No. 6 contact of relay AB5(8), conductor 805, No. 10 contact of relay TXA(8) to the BA5 lead.

Similarly, for digits "0" to "4" registered on the B digit register, one of the leads D0 to D4 is grounded by the operated B register relays and lead DB5 is grounded through the No. 2 contact of operated relay BB5(9). For digits "5" to "9" registered on the B digit register, one of the leads D0 to D4 is grounded by the operated B register relays and lead DA5 is grounded through the No. 1 contact of released relay BB5(9).

In the case of the C digit register, one of the G0 to G4 leads is grounded by the operated register relays, but the CB5 relay, corresponding to the AB5 and BB5 relays, has been omitted to demonstrate that wtih sufficient contacts available on the register relays, the "above 5" or "below 5" function may be executed in the register relays themselves. The No. 5 make contact of relay C0(7), the No. 3 make contact of relay C1(7), the No. 3 make contact of relay C2(7), the No. 2 make and the Nos. 6 and 7 transfer contacts of relay C4(5), and the No. 2 make and the Nos. 7 and 8 transfer contacts of relay C7(5) are suitably interconnected by obvious circuits to accomplish this function. Thus, the operation of relays C4(5) and C7(5) for the digit "0", the operation of relays C0(5) and C1(5) for the digit "1", the operation of relays C0(5) and C2(5) for the digit "2", the operation of relays C1(5) and C2(5) for the digit "3" (with both relays C4(5) and C7(5) unoperated), or the operation of relays C0(5) and C4(5) for the digit "4" will serve to ground lead GB5 to indicate a digit less than "5." On the other hand, the operation of relays C2(5) and C4(5) for the digit "6", the operation of relays C0(5) and C7(5) for the digit "7", or relays C1(5) and C7(5) for the digit "8", or relays C2(5) and C7(5) for the digit "9" (with relay C4(5) unoperated) will serve to ground lead GA5 to indicate a digit "5" or greater has been registered.

The LA lead, which is connected to the marker through the marker connector, is grounded at the No. 7 contact of relay 11B'(2), as is also the case in two-digit office codes and service codes, to serve, in the marker, to control the points of termination of the DA5 and DB5 leads.

*Communication with marker—two-digit office codes*

In the case of a two-digit office code, the sender is arranged to seize a marker after the two office code digits have been registered. It will be recalled that when a two-digit office code index is received and registered in the A digit register, relay TD(3) is operated. Then, with two of the five B digit register relays B0(7) to B7(5) operated, a circuit is closed from battery, holding windings of the two operated relays B0(7) to B7(5), No. 1 contacts of those operated B digit register relays, conductor 702, No. 5 contact of released walking relay BA(3), conductor 316, No. 4 contact of operated relay TD(3), conductor 311, winding of relay CL(3) to ground at off-normal ground lead GD1. As in the case of three-digit office codes, relay CL(3) operates relay DST(3) which serves to operate relay BTR(8) and to cause the marker connector to connect the leads from the sender register relays into the marker.

Due to the character of the marker, it is desirable to transmit the two-digit office code to the marker in the form of a three-digit code with "0" as the second digit. In other words, a two-digit code such as "25" is transmitted as code "205" to the marker.

This is accomplished by transmitting the information contained in the A digit register by grounding leads of the series B0 to B5 and BA5 or BB5 in the same manner as in the case of three-digit office codes, by grounding leads D0 and DB5 as if zero had been registered on the B digit register, and by transferring the contacts of the B digit register from the marker D series leads to the marker G series leads so that the digit registered on the B digit register is transmitted to the marker as if it had been registered in the C digit register.

The grounding of the D0 and DB5 leads, representing the digit "0," occurs as a result of the operation of relay TD(3), over a path from ground, Nos. 1 and 2 contacts of operated relay TD(3), conductors 318 and 319 to leads D0 and DB5, respectively, to the marker connector and marker (Fig. 8).

The operation of the TD(3) relay, when a two-digit office code index is received, also closes a circuit from ground, No. 7 contact of relay TD(3), conductor 317 to the windings of relays TXB(9) and TXC(9) and to battery. Leads 906, 907, 908, 909 and 910 from the contacts of the C digit register relays are disconnected from the G0, G1, G2, G3 and G4 leads, respectively, upon the operation of relay TXC(9). Operation of relay TXB(9) results in the transfer of the B digit register leads 901, 902, 903, 904 and 905 from the D0, D1, D2, D3 and D4 leads, respectively, to the G0, G1, G2, G3 and G4 leads, respectively. Operation of relays TXC(9) and TXB(9) also disconnects the GA5 and GB5 leads from the C digit register, and connects these leads to the No. 1 and No. 2 contacts, respectively, of the BB5 relay whereby lead GA5 or lead GB5 will be grounded, responsive to the condition of relay BB5, depending on whether the digit registered in the B digit register is above or below the digit "5." Thus, in the case of a two-digit office code, the digit registered in the B digit register will be transmitted to the marker over leads normally associated with the C digit register.

*Communication with marker—service codes*

In the case of service codes and two-digit TX codes, relay DST(3) is operated by relay ST(3), which, in turn, is operated upon the receipt of the start signal which the originating operator transmits following the service or TX code. As previously indicated, this start signal comprises a combination of frequencies that results in the grounding of the 7 and 10 leads by the multi-frequency pulse receiving circuit (Fig. 2).

It will be recalled that when a service code prefixed by the digit "1" is received, the initial digit "1" is registered on the 11A(2) and 11A'(2) relays, the second digit to be received (the first digit of the service code) is registered on the A digit register, and the third digit to be received (the second digit of the service code) is registered on the B digit register. With the initial digit "1" and the two digits of the service code registered, receipt of the start signal serves to operate relay C7(5) over grounded conductor 7 through the No. 9 contacts of released relays AA(2) and BA(3), No. 8 contact of operated relay CA(3), conductor 320, winding of relay C7(5) to battery. Receipt of the start signal also grounds the No. 10 lead which operates relay ST(3) over a path from grounded conductor 10, No. 2 contact of unoperated relay CL(3), conductor 321, No. 7 contact of operated relay 11A'(2), No. 4 contact of unoperated relay 11B'(2) (or by-passing this contact if the "S" option is used as hereinafter explained), conductor 240, No. 8 contact of unoperated relay C2(7), conductor 703, No. 3 contact of relay C7(5) (which is operated by the start signal), conductor 501, winding of relay ST(3), to battery. Relay ST(3), in operating, closes a circuit from ground at off-normal ground lead GD1, No. 3 contact of relay ST(3), conductor 322, No. 6 contact of relay OE(3), conductor 314, winding of relay DST(3) to battery. Relay DST(3), in operating, operates relay BTR(8) and causes the marker connector to connect the leads from the sender register relays into the marker as previously described. Relay DST(3) also prepares an operating path for the energization of relays TXA(8), TXB(9), and TXC(9), as hereinafter described.

In transmitting the service code designation to the marker, the initial digit "1" is transmitted over the B series leads normally associated with the A digit register, the next digit, which is registered in the A digit register, is transmitted over the D series leads normally associated with the B digit register, and the last digit of the service code, which is registered on the B digit register, is transmitted over the G series leads normally associated with the C digit register.

The initial digit "1" is transmitted to the marker by the grounding of the B1 and BB5 leads upon the operation of relays 11A(2) and 11A'(2). These paths may be traced from ground, No. 1 contact of operated relay 11A'(2), conductor 232, No. 3 contact of relay 11B'(2) (or by-passing this contact under the "S" option), conductor 233, to the B1 lead; and from ground, No. 5 contact of operated relay 11A'(2), conductor 234, No. 8 contact of relay 11B'(2) (or by-passing this contact under the "S" option), conductor 235, to lead BB5.

The operation of relays 11A(2) and 11A'(2) to register the initial digit "1" also results in the operation of relays TXA(8), TXB(9), and TXC(9) over paths from ground at off-normal ground lead GD1, No. 2 contact of relay DST(3), conductor 315, conductor 236, No. 3 contact of relay 11A(2), conductor 237, No. 2 contact of relay 11B'(2) (or by-passing this contact under the "S" option) and then over the parallel paths of conductor 243, winding of relay TXA(8) to battery, and conductor 239, No. 8 contact of relay TD(3), conductor 317, windings of relays TXB(9) and TXC(9) to battery. The operation of relay TXA(8) transfers the leads from the A digit register relays to the D series leads and connects the 804 and 805 leads from the AB5(8) relay to the DA5 and DB5 leads. The operation of relay TXB(9) transfers the leads from the B digit register relays to the G series leads and connects conductor 911, from the No. 2 contact of relay BB5(9), to conductor GB5. Relay TXC(9), in operating, connects conductor 912, from the No. 1 contact of relay BB5(9), to conductor GA5 and also disconnects the leads from the C digit register relays from the G series leads.

*Communication with marker—TX codes*

As will be explained in more detail hereinafter, in the case of two-digit TX codes the functioning of the circuits is similar and the resulting transmission to the marker is the same as in two-digit service codes. In the case of three-digit TX codes, the operation and resulting transmission to the marker is the same as in three-digit office codes. Therefore, means must be provided to enable the marker to distinguish TX codes from other types of codes. This is accomplished upon the operation of relay 11B'(2) when the second digit "1" prefixing a TX code is received. Relay 11B'(2), in operating, breaks, at its No. 7 contact, the previously existing connection between ground and lead LA, and establishes, at its No. 6 contact, a connection from ground to lead EA. Ground on lead LA indicates to the marker that an office or service code is being transmitted from the sender, and ground on lead EA indicates that a TX code is being transmitted.

Although the use of either two-digit or three-digit TX codes is contemplated, it may be noted that in the present disclosure no provision is made for the combined use of these two types of TX codes. When three-digit TX codes are used, the "T" option wiring at relay 11B'(2) is used, and when two-digit TX codes are used, the "S" option wiring is used. It may be noted that the "S" option wiring comprises the placing of shunts around the circuits through the Nos. 2, 3, 4 and 8 contacts of relay 11B'(2). Since relay 11B'(2) is unoperated except in the registration of TX codes, whether "S" or "T" option wiring is used is immaterial in the registration of office or service codes. For two-digit TX codes, the use of the "S" option shunts at relay 11B'(2) renders the circuits operative in the same fashion as that described for service codes. Since the Nos. 2, 3, 4 and 8 contacts of relay 11B'(2) are shunted, the operation of relay 11B'(2) is ineffective to break the circuits through these contacts, ground is placed on the B1 and BB5 leads and relays TXA(8), TXB(9), and TXC(9) are operated as before described. Therefore, the digit "1" is transmitted over the B series leads, the first digit of the TX code proper, which is registered on the A digit register, is transmitted over the B series leads, and the second digit of the TX code proper, which is registered on the B digit register, is transmitted over the G series leads.

For three-digit TX codes, "T" option wiring is used at the 11B'(2) relay. Therefore, with relay 11B'(2) operated, the previously traced energizing circuits for relays TXA(8), TXB(9) and TXC(9) are interrupted at the No. 2 contact of relay 11B'(2). Thus the leads from the A, B, and C digit registers are connected to the marker B series, D series and G series leads, respectively, in the same fashion as for regular office codes, and thus a three-digit TX code is transmitted to the marker in the same manner as is a three-digit office code. The above-discussed grounding of the EA lead again serves as a means for the marker to distinguish TX codes from office or service codes.

After the sender has seized a marker and has transmitted to the marker the above-discussed and other information, the marker decodes this information and passes information back to the sender by means of which the sender may make its selections in either a toll office, call indicator office, cross bar office, panel office, or step-by-step office. The marker also seizes office and trunk link frame connectors and establishes connection therewith over cables of conductors OLC and TLC. (Fig. 1). The marker then, by circuits not shown, grounds lead DC through the sender link (Fig. 1), to the trunk circuit of Fig. 1, through the No. 4 contact of relay D1(1), conductor 109, winding of relay F(1), to battery. Relay F(1), in operating, performs several functions including the closing of the sleeve to the SL lead to the marker for testing continuity, and the extending of the ground on the DC lead through the No. 4 contact of relay F(1) to the LC lead to operate a link connector relay associated with a primary switch in the trunk link. The marker, after checking the condition of the switches, releases relay F(1). The marker then checks that the sleeve ground from the No. 4 contact of relay T(1) is capable of holding the connection, and then releases.

When the sender has completed its selections, lead D (Fig. 1) is grounded in a portion of the sender not shown. This ground is conducted over lead D, No. 8 contact of released relay F(1), conductor 110, conductor 111, winding of relay D(1), to battery. Relay D(1), in operating, closes a circuit from ground, No. 3 contact of relay D(1), conductor 112, winding of relay D1(1), to battery. Relay D1(1), in operating, interrupts the energizing path for relay A(1) from the ring conductor R at the No. 8 contact of relay D1(1), and prepares an energizing circuit for relay A(1) from the tip conductor of the trunk TR, upper contacts of test jack JA(1), tip conductor T, conductor 113, No. 7 contact of relay D1(1), conductor 102, No. 7 contact of relay T(1) (when relay T(1) subsequently releases), conductor 103, conductor 104, lower winding of relay A(1) to ground. Thus the connections from the incoming trunk to relay A(1) have been reversed by the operation of relay D1(1). Operation of relay D1(1) also closes a ground through the No. 3 contact of relay D2(1), conductor 114, No. 3 contact of relay T(1), conductor 115, No. 5 contact of relay D1(1), to conductor DC to the sender. Relay D1(1), in operating, also closes a temporary holding circuit for the trunk link and connector switches.

Upon receiving ground on lead DC, the sender, as previously explained, removes ground from lead CO which interrupts the energizing circuit for relay T(1). Relay T(1) releases and closes the previously traced energizing circuit for relay A(1) from battery on the tip conductor T. Release of relay T(1) also removes ground from the DC lead at the No. 3 contact of relay T(1), and also closes an energizing circuit for relay D2(1) from ground, No. 5 contact of relay T(1), conductor 108, No. 9 contact of relay D1(1), conductor 116, winding of relay D2(1), to battery. Relay D2(1) locks operated under the control of relay D1(1) through a path from ground, No. 4 contact of relay D2(1), conductor 108, No. 9 contact of relay D1(1), conductor 116, winding of relay D2(1), to battery. Relay D2(1), in operating, closes the final holding circuit for the trunk and office switches and opens lead ST at the No. 7 contact of relay D2(1).

When trunk closure takes place, relay A(1) operates and connects ground through its contact to conductor 105. This ground is conducted through the No. 1 contact of relay D(1), serves as a locking ground for relay D(1), and is conducted over conductor 111, conductor 110, No. 8 contact of relay F(1), to the D lead to serve as a disconnect signal to the sender. The sender link releases and leaves the connection under control of relays A(1) and D(1).

When the called subscriber answers, the incoming trunk in the called office reverses its battery and ground to the tandem trunk circuit of Fig. 1. This reversal results in the operation of relay CS(1). The CS(1) relay closes a circuit from ground, armature of relay CS(1), No. 1 contact of relay CS(1), conductor 117, No. 2 contact of relay D2(1), winding of relay T(1), to battery. Relay T(1), in operating, reverses the battery and ground to the calling office, as previously described, thereby repeating the supervision.

When the call has been completed and the calling subscriber has disconnected, the originating operator opens the trunk circuit at the originating office and relay A(1) releases. Release of relay A(1) interrupts the holding path for relay D(1), and relay D(1) also releases. Relay D(1) interrupts the energizing circuit for relay D1(1) and relay D1(1) releases. Relay D1(1), in releasing, interrupts the previously traced holding path for relay D2(1), so relay D2(1) releases. Relay D2(1), in releasing, releases the trunk link and connector switches and recloses, at its No. 7 contact, lead ST in preparation for the receipt of the next call.

The above description of the invention is purely illustrative and the association of the invention with the disclosed cooperating equipment is but representative, and is not to be interpreted in a limiting sense.

What is claimed is:

1. In a telephone system, a plurality of registers for registering the digits of telephonic designations, a like plurality of pairs of relays, circuit means connected to said pairs of relays simultaneously operating all of said relays, circuit means comprising selective control means and contacts of a first of said pairs of relays connecting said control means to a first of said registers for operating said first register in accordance with the first digit of a designation, relay means connected to said first register and to said first pair of relays rendered effective by the registration of any of certain digits on said first register to release said first pair of relays, circuit means comprising said selective control means and contacts of said first pair and of a second pair of said relays connecting said control means to a second of said registers for operating said second register in accordance with the second digit of a designation, relay means connected to said second register and to said second pair of relays rendered effective by the registration of a digit of any value on said second register to release said second pair of relays, circuit means comprising said selective control means and contacts of said first and said second and of a third pair of said relays connecting said control means to a third of said registers for operating said third register in accordance with the third digit of a designation, and relay means connected to said first register and to said third pair of relays rendered effective by the registration of a digit of a predetermined particular value on said first register to release said third pair of relays.

2. In a telephone system, a first, a second and a third register for registering digits of telephonic designations, a first, a second and a third group of output conductors, register control means, circuit means for successively connecting said registers to said control means for setting said registers in accordance with the digits of a telephonic designation, apparatus including said first register connected to said circuit means effective when said first register is operated to a predetermined setting for disabling said circuit means to connect said third register to said control means, relay means for connecting said first, said second and said third groups of conductors to said first, said second and said third registers respectively, means including said relay means connected to and controlled by said apparatus for connecting said third group of conductors to said second register, and means including said relay means connected to and controlled by said apparatus for connecting a source of potential to a preselected one of said second group of conductors.

3. In a telephone system, a first, a second and a third register for registering digits of telephonic designations, a first, a second and a third group of output conductors, register control means, circuit means connecting said first register to said control means for setting said first register in accordance with the first digit of a designation, means including said circuit means connecting said second register to said control means for setting said second register in accordance with the second digit of a designation, apparatus including said first register connected to said circuit means effective when said first register is operated to a predetermined setting for disabling said circuit means to connect said third register to said control means, relay means for connecting said first, said second and said third group of conductors to said first, said second and said third registers respectively, means including said relay means connected to and controlled by said apparatus for connecting said third group of conductors to said second register, and means including said relay means connected to and controlled by said apparatus for connecting a source of potential to a preselected one of said second group of conductors.

4. In a telephone system, a first, a second and a third register for registering the digits of telephonic designations, a first, a second and a third group of output conductors, register control means, circuit means connecting said first register to said control means for setting said first register in accordance with the first digit of a designation, apparatus including said first register connected to said circuit means effective when said first register is operated to a predetermined setting for releasing said first register, relay means for connecting said first, said second and said third group of conductors to said first, said second and said third registers respectively, means including said relay means connected to and controlled by said apparatus for connecting a source of potential to a preselected one of said first group of conductors, means including said relay means connected to and controlled by said apparatus for connecting said second group of conductors to said first register, and means including said relay means connected to and controlled by said apparatus for connecting said third group of conductors to said second register.

5. In a telephone system, a first, a second and a third register for registering the digits of telephonic designations, a first, a second and a third group of output conductors, register control means, circuit means connecting said first register to said control means for setting said first register in accordance with the first digit of a designation, means including said circuit means and said first register for connecting said second register to said control means for setting said second register in accordance with the second digit of a designation, apparatus including said first register connected to said circuit means effective when said first register is operated to a predetermined setting for releasing said first register, relay means for connecting said first, said second and said third group of conductors to said first, said second and said third registers respectively, means including said relay means connected to and controlled by said apparatus for connecting a source of potential to a preselected one of said first group of conductors, means including said circuit means and said second register for connecting said third register to said control means for setting said third register in accordance with the third digit of a designation, means including said relay means connected to and controlled by said apparatus for connecting said second group of conductors to said first register, and means including said relay means connected to and controlled by said apparatus for connecting said third group of conductors to said second register.

6. In a telephone system, a code transmitting device for transmitting the digits of telephonic designations, a plurality of registers for registering said digits, a group of input conductors connected to said device, circuit means connecting the first of said registers to said input conductors for setting said first register in accordance with the first digit of a designation, means including said circuit means and said first register effective when said first register is operated to any of its setting except certain settings for connecting the second of said registers to said input conductors for setting said second register in accordance with the second digit of a designation, and apparatus connected to said first register effective when said first register is operated to said certain settings for releasing said first register.

7. In a telephone system, a code transmitting device for transmitting the digits of telephonic designations, a first, a second and a third register for registering said digits, a group of input conductors connected to said device, a first, a second and a third group of output conductors, circuit means connecting said first register to said input conductors for setting said first register in accordance with the first digit of a designation, means including said circuit means and said first register effective when said first register is set to any of its settings except certain settings for connecting said second register to said input conductors for setting said second register in accordance with the second digit of a designation, apparatus including said first register connected to said circuit means effective when said first register is operated to said certain settings for releasing said first register, relay means for connecting said first, said second and said third groups of conductors to said first, said second and said third registers respectively, means including said relay means connected to and controlled by said apparatus for connecting a source of potential to a preselected one of said first group of conductors, means including said relay means connected to and controlled by said apparatus for connecting said second group of conductors to said first register, and means including said relay means connected to and controlled by said apparatus for connecting said third group of conductors to said second register.

8. In a telephone system, a plurality of registers for registering the digits of telephonic designations, register control means connected to a first of said registers for setting said first register, apparatus connected to and controlled by the operation of said first register to a certain setting for releasing said first register, and means connected to said apparatus and to said first register effective when said first register is released after having been operated to said certain setting a second time for disabling said apparatus.

9. In a telephone system, a plurality of registers for registering the digits of telephonic designations, register control means, circuit means connecting a first of said registers to said control means for setting said first register, first apparatus including said circuit means connected to said first register effective when said first register is operated to any of its settings except certain settings for connecting a second of said registers to said control means, second apparatus connected to said first register effective when said first register is operated to said certain settings for releasing said first register, means connected to said second apparatus and to said first register effective when said first register is released after having been operated to said certain settings a second time for disabling said second apparatus, and means connected to said first apparatus and to said first register effective when said first register is released after having been operated to said certain settings a second time for rendering said first apparatus effective when said first register is operated to any of its settings.

10. In a telephone system, a first, a second and a third register for registering the digits of telephonic designations, a first, a second and a third group of output conductors, register control means, circuit means connecting said first register to said control means for setting said first register, apparatus connected to said first register effective when said first register is operated to a predetermined setting for releasing said first register, relay means for connecting said first, said second and said third groups of conductors to said first, said second and said third registers respectively, means including said relay means connected to and controlled by said apparatus for connecting a source of potential to a preselected one of said first group of conductors, means connected to said apparatus and to said first register effective when said first register is released after having been operated to said predetermined setting a second time for disabling said apparatus, means including said relay means connected to and controlled by said apparatus for connecting said second group of conductors to said first register, and means including said relay means connected to and controlled by said apparatus for connecting said third group of conductors to said second register.

11. In a telephone system, a first, a second and a third register for registering the digits of telephonic designations, a first, a second and a third group of output conductors, register control means, circuit means connecting said first register to said control means for setting said first register, first apparatus including said circuit means connected to said first register effective when said first register is operated to any of its settings except certain settings for connecting said second register to said control means, second apparatus connected to said first register effective when said first register is operated to said certain settings for releasing said first register, relay means for connecting said first, said second and said third group of conductors to said first, said second and said third registers respectively, means including said relay means connected to and controlled by said second apparatus for connecting a source of potential to a preselected one of said first group of conductors, third apparatus connected to said first register effective when said first register is operated to said certain settings a second time for releasing said first register, means connected to said first apparatus and connected to and controlled by said third apparatus for rendering said first apparatus effective when said first register is operated to any of its settings, means including said relay means connected to and controlled by said second apparatus for connecting said second group of conductors to said first register, and means including said relay means connected to and controlled by said second apparatus for connecting said third group of conductors to said second register.

12. In a telephone system, a plurality of registers for registering the digits of telephonic designations, register control means connected to a first of said registers for setting said first register, apparatus connected to and controlled by the operation of said first register to a certain setting for releasing said first register, means connected to said apparatus and to said first register effective when said first register is released after having been operated to said certain setting a second time for disabling said apparatus, and means connected to said apparatus for transmitting an indication that said first register has been twice set in said certain setting.

13. In a telephone system, a plurality of registers for registering the digits of telephonic designations, register control means, circuit means connecting a first of said registers to said control means for setting said first register, first apparatus including said circuit means connected to said first register effective when said first register is operated to any of its settings except certain settings for connecting a second of said registers to said control means, second apparatus connected to said first register effective when said first register is operated to said certain settings for releasing said first register, means connected to said second apparatus and to said first register effective when said first register is released after having been operated to said certain settings a second time for disabling said second apparatus, means connected to said first apparatus and to said first register effective when said first register is released after having been operated to said certain settings a second time for rendering said first apparatus effective when said first register is operated to any of its settings, and means connected to said second apparatus for transmitting an indication that said first register has been twice operated to said certain settings.

WILLIAM T. HAINES.
JAMES B. NEWSOM.

References Cited in the file of this patent

UNITED STATES PATENTS

| Number | Name | Date |
|---|---|---|
| 1,595,072 | Calverly | Aug. 10, 1926 |
| 1,729,854 | Nelson | Oct. 1, 1929 |
| 1,862,549 | Raymond et al. | June 14, 1932 |
| 1,874,684 | Wright | Aug. 30, 1932 |
| 2,283,395 | Strickler | May 19, 1942 |
| 2,355,908 | Dehn | Aug. 15, 1944 |